United States Patent [19]

Koizumi et al.

[11] Patent Number: 5,497,249
[45] Date of Patent: Mar. 5, 1996

[54] IMAGE DATA PROCESSING APPARATUS WITH SELECTIVE PROCESSING FILTERS

[75] Inventors: Taeko Koizumi; Michiko Kawano, both of Kawasaki, Japan

[73] Assignee: Fujitsu Limited, Kawasaki, Japan

[21] Appl. No.: 252,010

[22] Filed: May 31, 1994

[30] Foreign Application Priority Data

Aug. 18, 1993 [JP] Japan .................................. 5-204138

[51] Int. Cl.⁶ .................................................. H04N 1/407
[52] U.S. Cl. ........................... 358/462; 358/464; 382/263
[58] Field of Search .............................. 382/18, 54, 168, 382/169, 172, 263–265; 358/462–463, 465–466, 454–458, 518, 520, 521, 522; 348/614, 615, 625; H04N 1/407, 1/409

[56] References Cited

U.S. PATENT DOCUMENTS

| | | | |
|---|---|---|---|
| 4,637,054 | 1/1987 | Hashim | 382/18 |
| 5,314,667 | 7/1992 | Suzuki | 358/520 |
| 5,339,365 | 8/1994 | Kawai et al. | 382/54 |
| 5,381,490 | 1/1995 | Shin | 358/462 |

*Primary Examiner*—Kim Yen Vu
*Attorney, Agent, or Firm*—Staas & Halsey

[57] ABSTRACT

An image data processing apparatus, in particular, an apparatus which performs filter processing on original image data, wherein an image data statistical processing unit is used to extract and statistically processing the characteristics of picture element distribution in the picture expressed by the original image data, an image data decision unit is used to decide on whether the original image data belongs to a first kind or second kind of picture based on the results of the statistical processing, and a filter selection unit is used to designate the filter size to be used by a filter processing unit so that it is possible to automatically discriminate between a first kind of picture which is suited to sharpening processing (e.g., a landscape) and a second kind of picture which is suited to smoothing processing (e.g., a portrait) and possible to automatically select the optimum filter.

8 Claims, 11 Drawing Sheets

IMAGE DATA PROCESSING APPARATUS WITH SELECTIVE PROCESSING FILTERS

BACKGROUND OF THE INVENTION

1. Field of the Invention

The present invention relates to an image data processing apparatus, and more particularly to an image data processing apparatus which applies filter processing to color image data.

In recent years, there have been striking developments in television, color printing, and other color image media and demands have grown for greater diversification and higher quality of the color images in printer output and in displays given to the final users.

For example, when outputting original color image data input from a scanner or other input unit to a printer, various types of modification of image data, such as adding some shading of the original color image data so as to smooth it a bit, have been demanded.

In the field of image processing, the most basic type of image data processing technique for meeting the above demands is known as filter processing. The present invention mainly relates to an image data processing apparatus designed for such filter processing.

2. Description of the Related Art

As will be explained in further detail later with reference to the attached drawings, in the conventional image data processing apparatus, the original image data is taken out from an image storage unit and that original image data is subjected to filter processing by a filter selected by an indication from the operator. In this case, the filter is taken out from a filter storage unit.

In such a filter storage unit, conventionally, just one filter of each filter size has been allotted to one type of image processing. That is, before a certain image processing was started, if the operator indicated he wanted "sharpening", a filter of a small filter size was allotted and that filter size could not be changed until the image processing ended. In the same way, if the operator indicates "smoothing" at the start of a certain image processing, a filter of a large filter size had to be used until continuously the image processing ended.

However, users are increasingly interested in higher qualities of images along with the development of the color image media mentioned above and therefore it is becoming no longer possible to meet user demands with filter processing using a single filter for each type of image processing. That is, with the conventional type of filter processing in an image processing apparatus, there is the problem that it is not possible to select a suitable filter size in accordance with the properties of the picture expressed by the original image data.

SUMMARY OF THE INVENTION

According, the present invention, in consideration of the above-mentioned problems, has as its object the provision of an image data processing apparatus which can performing filter processing in which the filter size meeting the properties of the picture expressed by the original image data can be automatically selected.

To attain the above object, the present invention provides an image data processing apparatus in which an image data statistical processing unit is used to extract and statistically process the characteristics of picture element distribution in the picture expressed by the original image data, an image data decision unit is used to decide on whether the original image data belongs to a first kind or a second kind of picture based on the results of the statistical processing: and a filter selection unit is used to designate the filter size to be used by a filter processing unit so that it is possible to automatically discriminate between a first kind of picture which is suited to sharpening processing (e.g., a landscape) and a second kind of picture which is suited to smoothing processing (e.g., a portrait) and further is possible to automatically select the optimum filter.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the problems therein will be first described with reference to the related figures.

Figure 1:
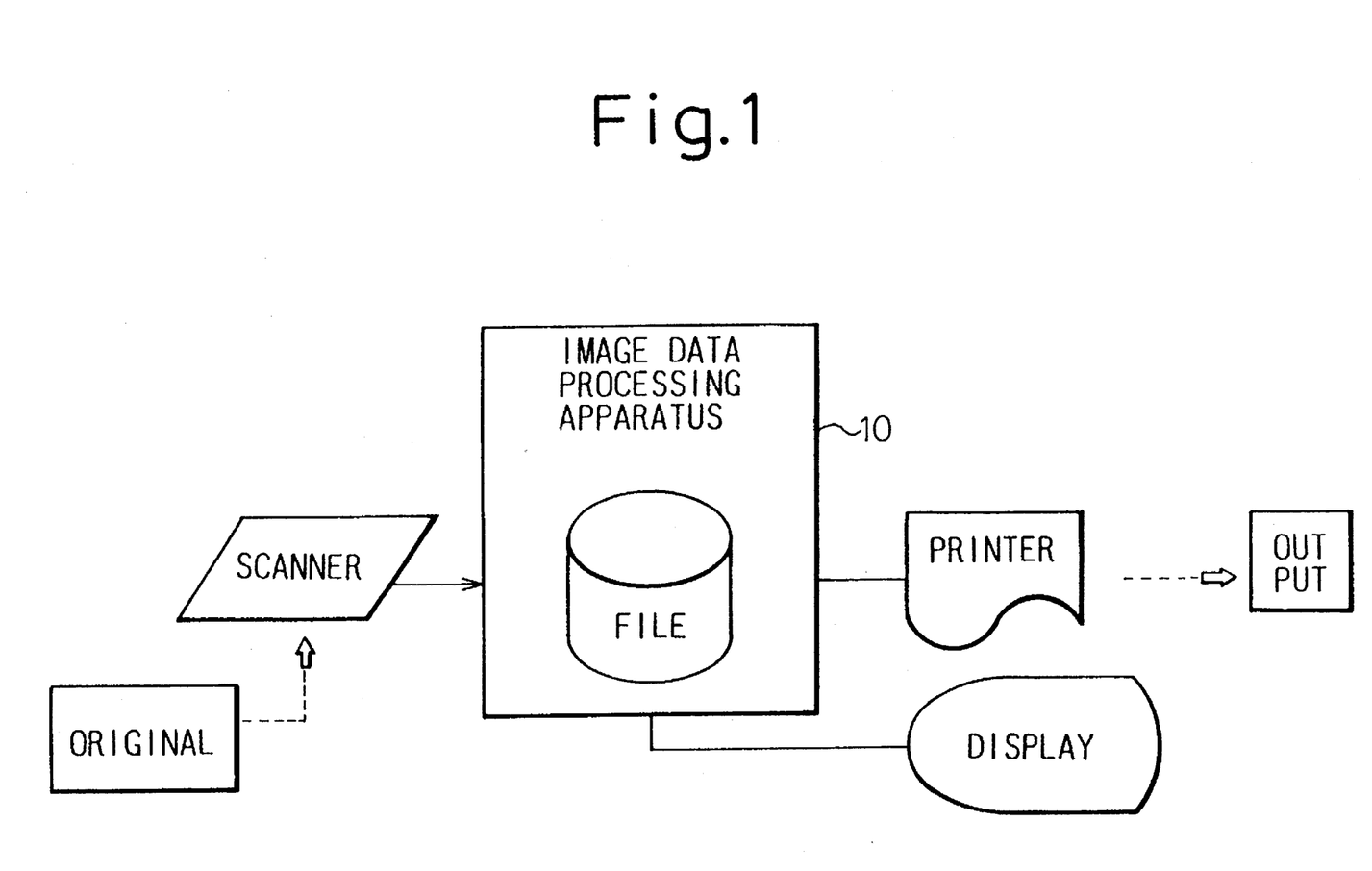
FIG. 1 is a view of an example of the system configuration of a general image data processing apparatus.

FIG. 1 is a view of an example of the system configuration of a general image data processing apparatus. In the figure, 10 is an image data processing apparatus, inside of which is shown a file holding processed image data.

An original is read in from a scanner or other input unit. This is subjected to various types of modification by the image data processing apparatus 10, so as to produce the image data which is output to a printer or shown on a display and thereby to provide an image to the user.

Figure 2:
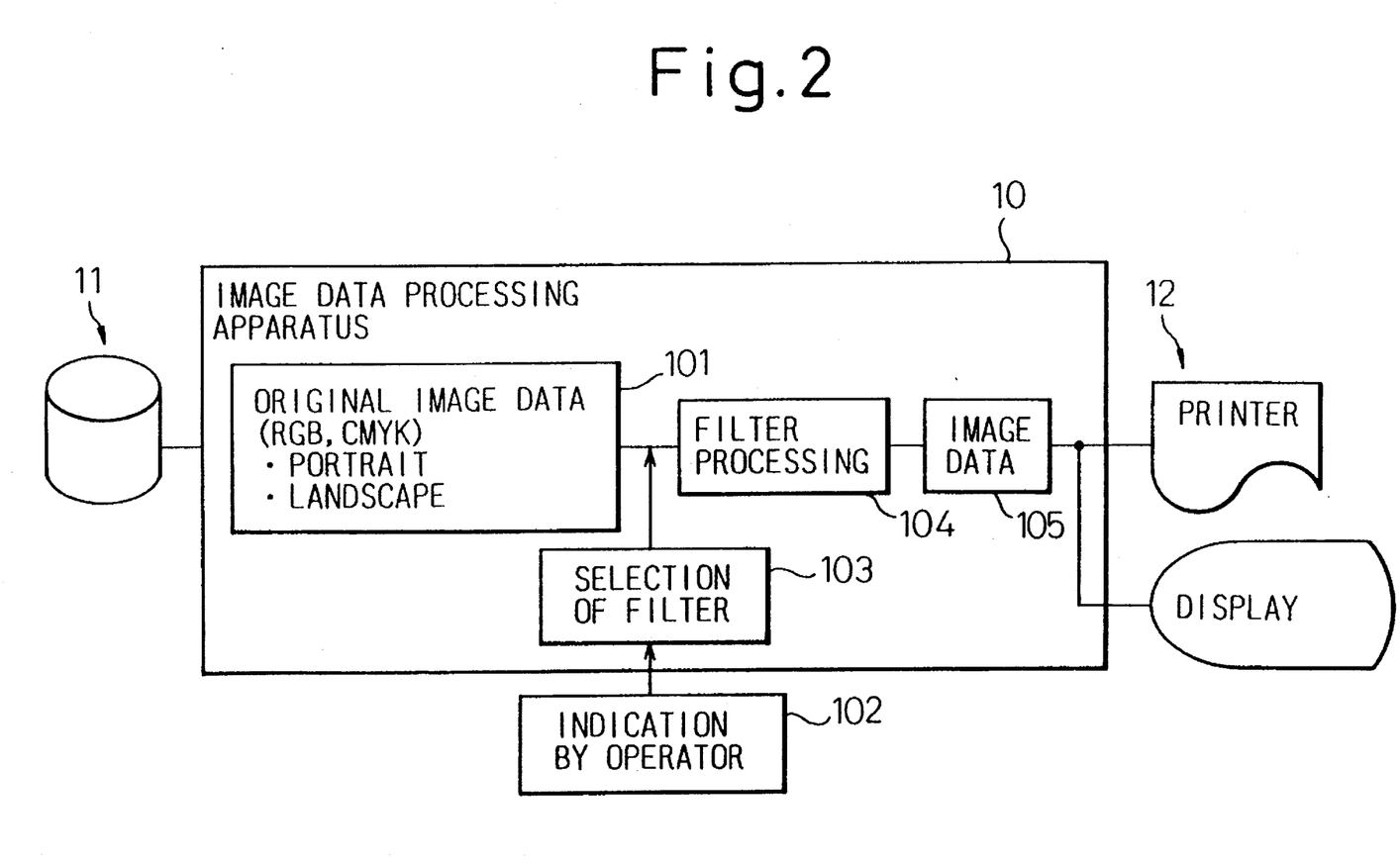
FIG. 2 is a view for explaining conventional filter processing.

FIG. 2 is a view for explaining a conventional filter processing. In the figure, 11 is an image data storage unit, from which the original image data is taken and made input into the image data processing apparatus 10 as original image data 101. This original image data is expressed by so-called RGB (red, green, and blue) data and CMYK (cyan, magenta, yellow, black) data.

The pictures expressed by the original image data 101 include at least a first kind of picture and a second kind of picture. Specifically, the first kind of picture 15 consists of a landscape and the second kind of picture, a portrait.

On the other hand, the filter processing is first designated in content by an operator indication 102. This indication is either to sharpen the image or else to smooth the image.

Based on the operator indication 102, the filter is selected at 103 and filter processing 104 is performed by the selected filter.

Accordingly, filter processing is applied to the original image data and thereby processed image data 105 is obtained. The processed image data 105 is output to a printer or shown on a display by the image output unit 12.

With respect to the picture quality at the image output unit 12, in general, it is considered better to reduce the degree of sharpness in the case of a portrait as opposed to a landscape. In the filter processing 104, the filter size has a significant affect on the degree of sharpness. That is, when it is better that the degree of sharpness be low, as in the case of a portrait, a filter of a large filter size is selected by the filter selection unit 11. Conversely, when it is better that the degree of sharpness be high, as in the case of a landscape, a filter of a small filter size is selected by the filter selection unit 103.

Figure 3:
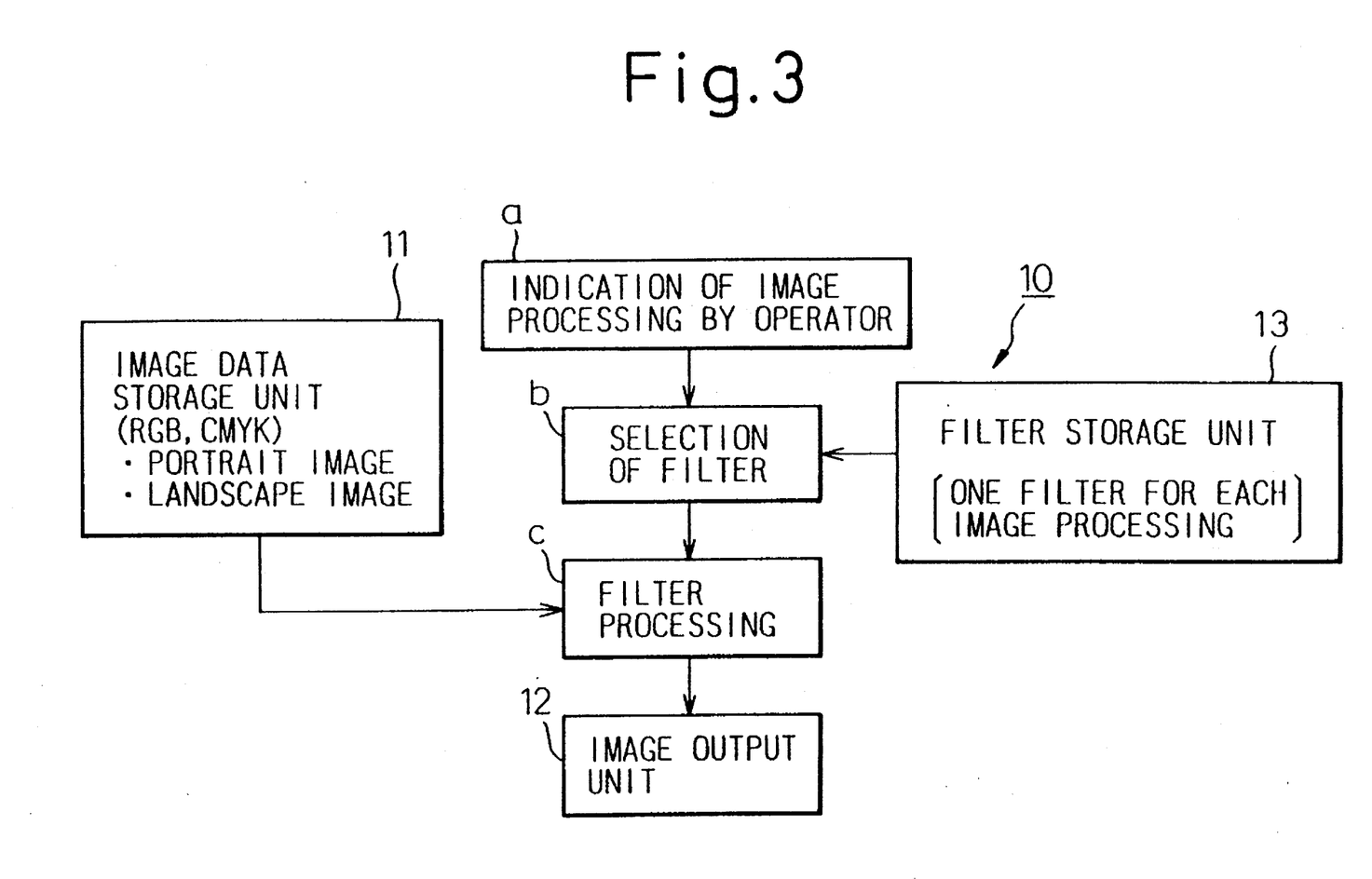
FIG. 3 is a view showing the conventional filter processing by steps.

FIG. 3 is a view showing the conventional filter processing by steps.

Step a: The operator provides an indication of the image processing to be performed. Included in this is an indication as to whether the output image is to be sharpened or smoothened and indications as to enlargement, shrinkage, color modification, etc.

Step b: If the operator indicates sharpening (or smoothing) processing, the single matching filter is taken out from the filter storage unit 13 which stores filters of various filter sizes.

Step c: The filter taken out at step b is used for filter processing of the original image data from the image data storage unit 11. The processed image data is stored once in the image data buffer (not shown), then supplied to the image output unit 12.

As shown in the filter storage unit 13 of FIG. 3, and as mentioned earlier, conventionally, just one filter of each filter size had been allotted to one type of image processing. That is, before a certain image processing was started, if the operator indicated he wanted "sharpening", a filter of a small filter size was allotted and that filter size could not be changed until the image processing ended. In the same way, if the operator indicated "smoothing" at the start of a certain image processing, a filter of a large filter size had to be used continuously until the image processing ended.

However, users are increasingly interested in higher qualities of images along with the development of the color image media mentioned above and, therefore, it is becoming no longer possible to meet user demands with filter processing using a single filter for each type of image processing. That is, with the conventional type of filter processing in an image processing apparatus, there exists the previously mentioned problem that it was not possible to select the filter size suitably in accordance with the properties of the picture expressed by the original image data.

Therefore, the present invention provides an image data processing apparatus which can perform filter processing in which the filter size meeting the properties of the picture expressed by the original image data can be automatically selected.

Figure 4:
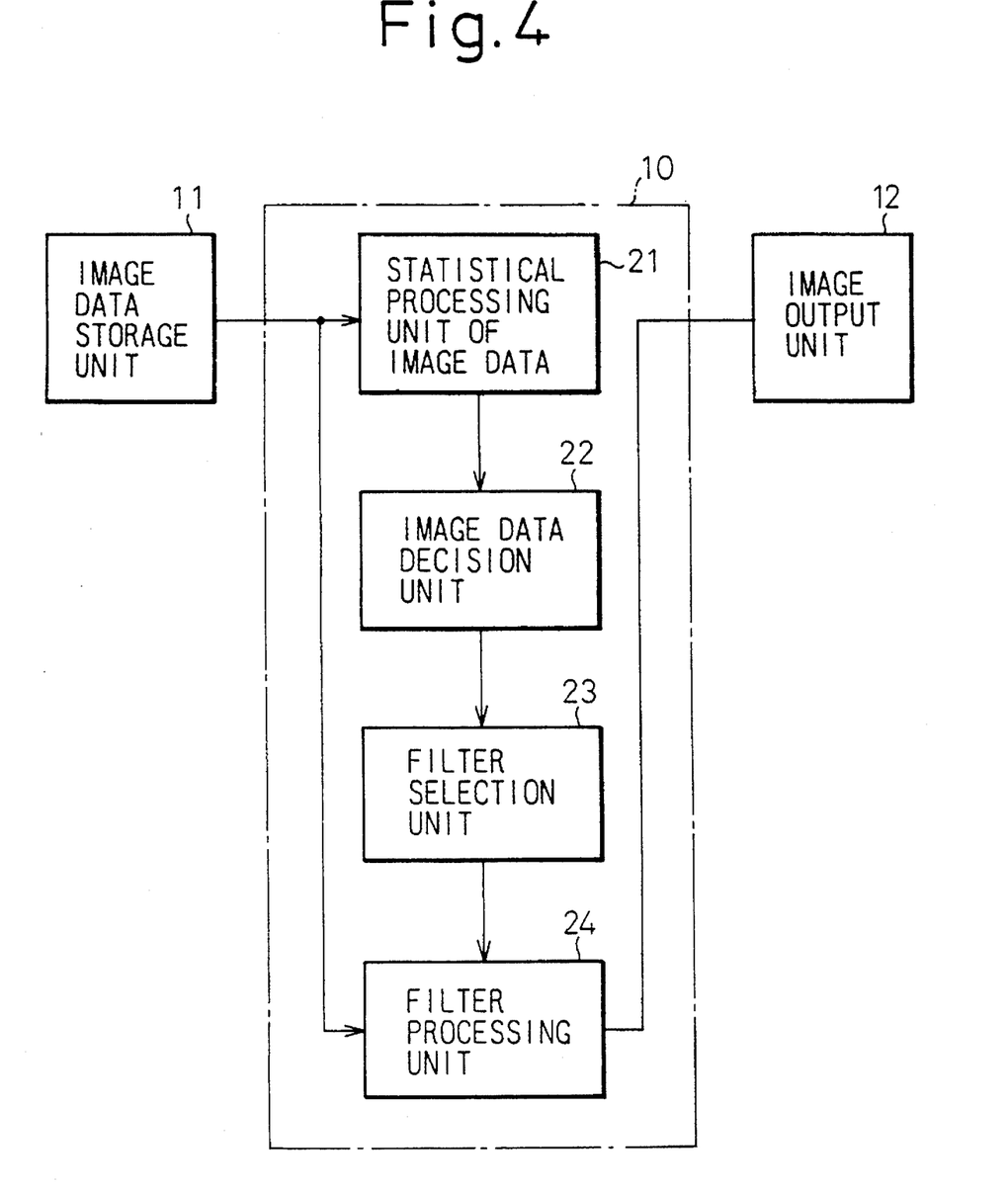
FIG. 4 is a block diagram of the basic configuration of the present invention.

FIG. 4 is a block diagram of the basic configuration of the present invention. The image data processing apparatus 10 of the present invention is basically the same as the conventional image data processing apparatus in the sense that it applies processing to the original image data input received from the image data storage unit 11 and then supplies the processed image data to the image output unit 12; however inside, based on the present invention, provision is made of the four illustrated functional blocks 21, 22, 23, and 24.

The statistical processing unit 21 takes in the original image data from the image data storage unit 11, then extracts and performs statistical processing on the picture element distribution in the picture expressed by the original image data.

The image data decision unit 22 decides, based on the results of the statistical processing by the image data statistical processing unit 21, whether the picture is a first kind of picture suited for sharpening processing or a second kind of picture suited for smoothing processing.

The filter selection unit 23 selects a first type of filter when it is judged, based on the results of the decision by the image data decision unit 22, that the picture belongs to the first kind and selects a second type of filter, of a filter size larger than the first type, when it is judged that the picture belongs to the second kind The filter processing unit 24 uses the first type of filter or the second type of filter selected by the filter selection unit 23 to apply filter processing on the original image data from the image data storage unit 11 and supplies the resultant image data to the image output unit 12.

Figure 5:
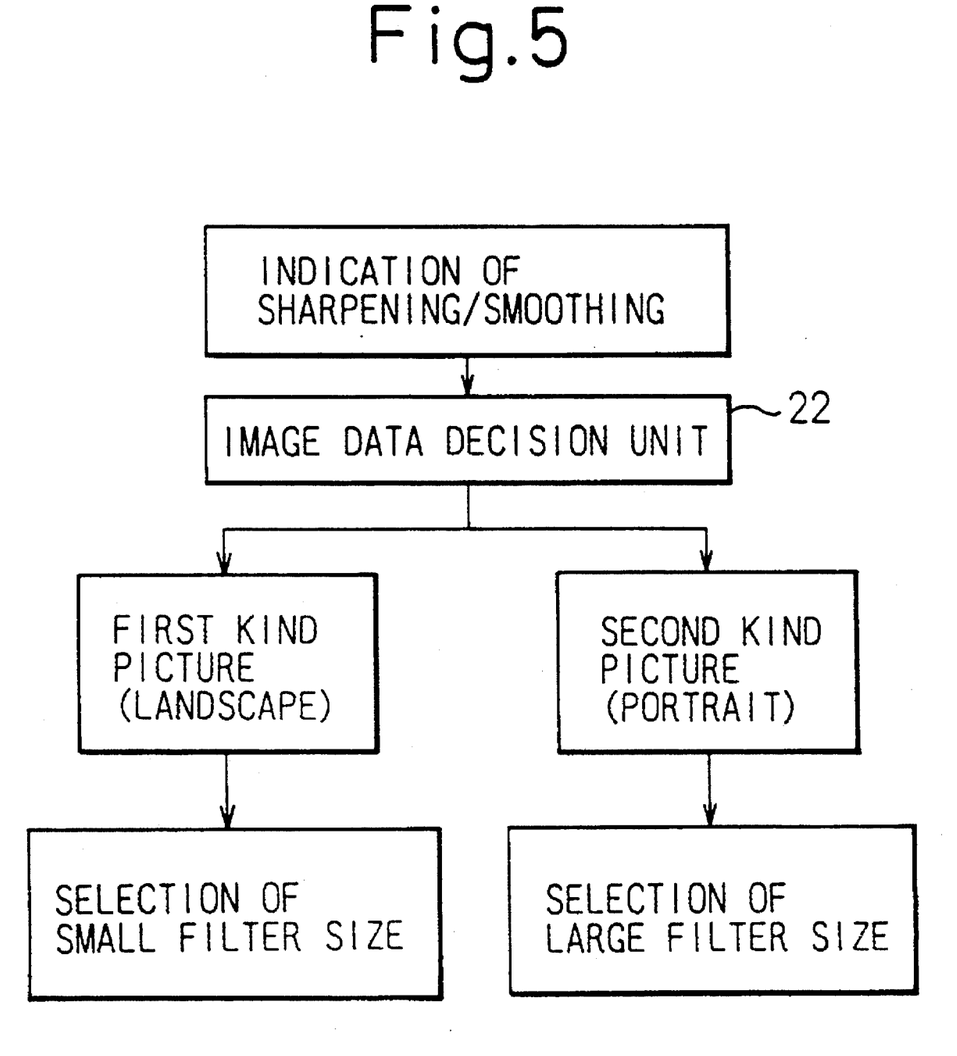
FIG. 5 is a schematic view of the operation for selection of the filter selection unit.

As explained above, the image data is classified into a first kind of picture (landscape, etc.) or a second kind of picture (portrait etc.) by statistical processing. Image data requiring a high degree of sharpness such as the first kind of picture is subjected to a filter processing of selecting a filter of a small filter size, while image data for which a low degree of sharpness is preferred, such as the second kind of picture, is subjected to a filter processing of selecting a filter of a large filter size. This operation is performed automatically. The state of this is shown in FIG. 5. According to this, a high quality color image output, meeting the needs of the user, is obtained. In this case, the original image data to be subjected to filter processing is data composed of L* (saturation) data and a*b* (hue and brightness) data expressed under a uniform color space said to visually perceptually match with human senses. It is preferable to give only the data a*b* among this data to the image data statistical processing unit 21. By removing the data L* and using Just the data a*b*, it is possible to perform the steps up to the filter selection at a high speed. Note that these data L*, a*, and b* may be expressed in a three-dimensional space defined by an orthogonal X-axis (a*), Y-axis (b*), and Z-axis (L*). Here, a* and b* are distributed along the X-axis and the Y-axis, respectively, while L* is distributed along the Z-axis.

Figure 6:
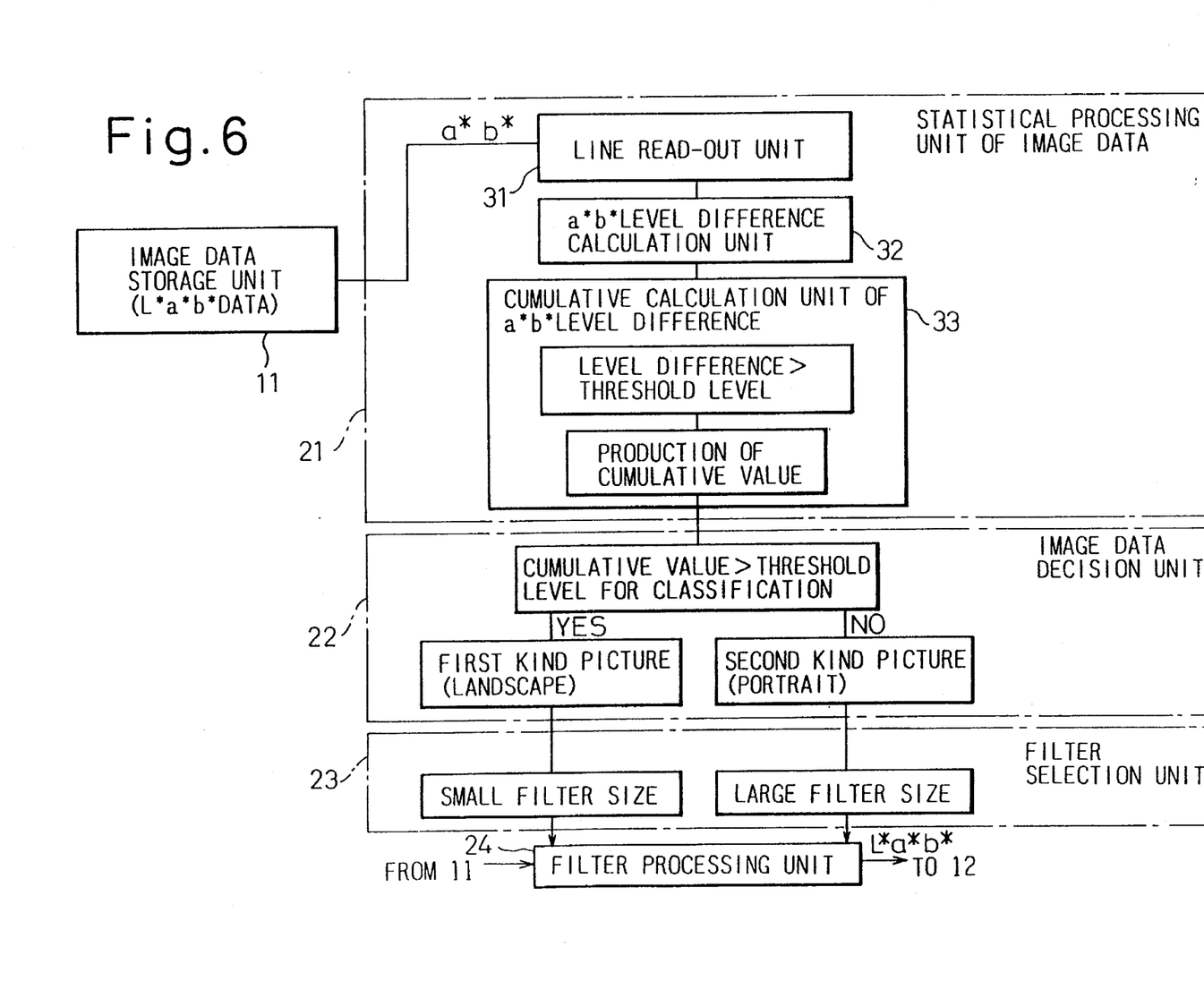
FIG. 6 is a view Of a first embodiment of the present invention.

FIG. 6 is a view of a first embodiment of the present invention. In the first embodiment, the image data statistical processing unit 21 extracts the characteristics of the picture element distribution by calculating whether the change of the color between adjoining picture elements is large or small, for all of the picture. The image data decision unit 22 is designed to decide whether the input image is a first kind of picture or a second kind of picture in accordance with whether the changes are large or small.

More specifically, as shown in FIG. 6, the image data statistical processing unit 21 is comprised of a line read-out unit for individually reading out the data a* and b* of the picture elements for each line in a picture comprised of a plurality of lines, a level difference calculation unit 32 for calculating the level difference of the data a* and b* between adjoining picture elements from the output from the line read-out unit 31, and a level difference cumulative calculation unit 33 for extracting just those calculated level differences which exceed a certain threshold and cumulatively adding them for the picture to calculate the cumulative value.

Further, the image data decision unit 22 compares the cumulative value from the level difference cumulative calculation unit 33 with a predetermined threshold value for differentiation of the kind of picture and decides whether a picture is the first kind of picture or the second kind of picture in accordance with whether the cumulative value is large or not. That is, if the cumulative value is large, then the picture is the first kind (landscape) with abundant color changes, while if the cumulative value is small, then the picture is the second kind (portrait) with little color change.

Figure 7A:
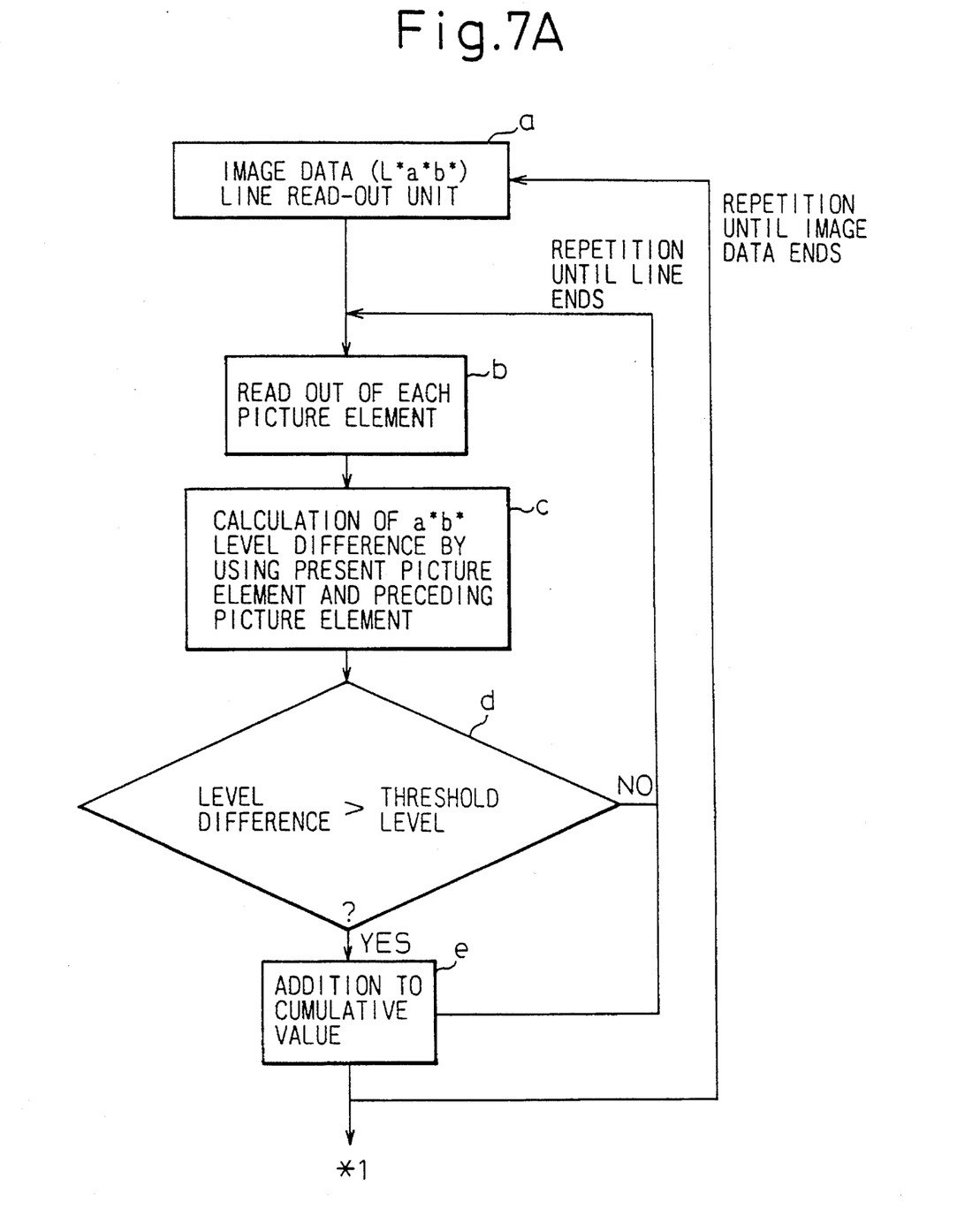
FIGS. 7A and 7B are flow charts of the operation under the first embodiment.
Figure 7B:
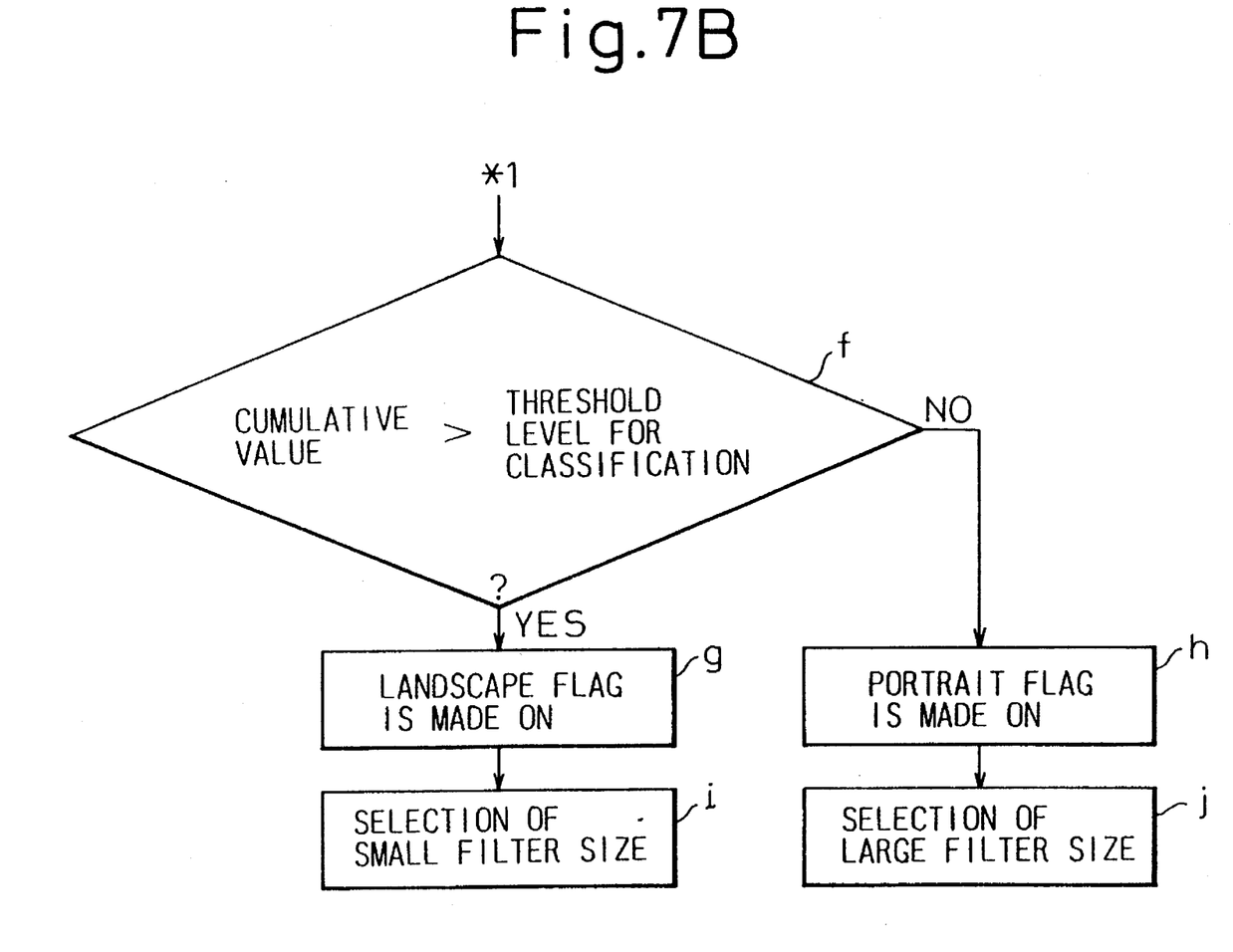

FIGS. 7A and 7B are flow charts of the operation under the first embodiment and shows the steps until just before that of the filter processing unit 24 is reached. Note that, given a supplementary explanation of the image data (L,a, b*), to translate the original image data (RGB) to L*a*b* data, an RGB-L*a*b* translation table is required. This translation table is provided between the output of the image data storage unit 11 at the top left of FIG. 6 and the line read-out unit 31, but is not illustrated likewise, in FIG. 8 relating to a later-discussed, second embodiment).

This translation table establishes correspondence between the data (RGB level data) input by scanning the color original (different colors) and data obtained by measuring the color original by a colorimeter (L*a*b* data). This correspondence may further be approximated by a polynomial).

Figure 8:
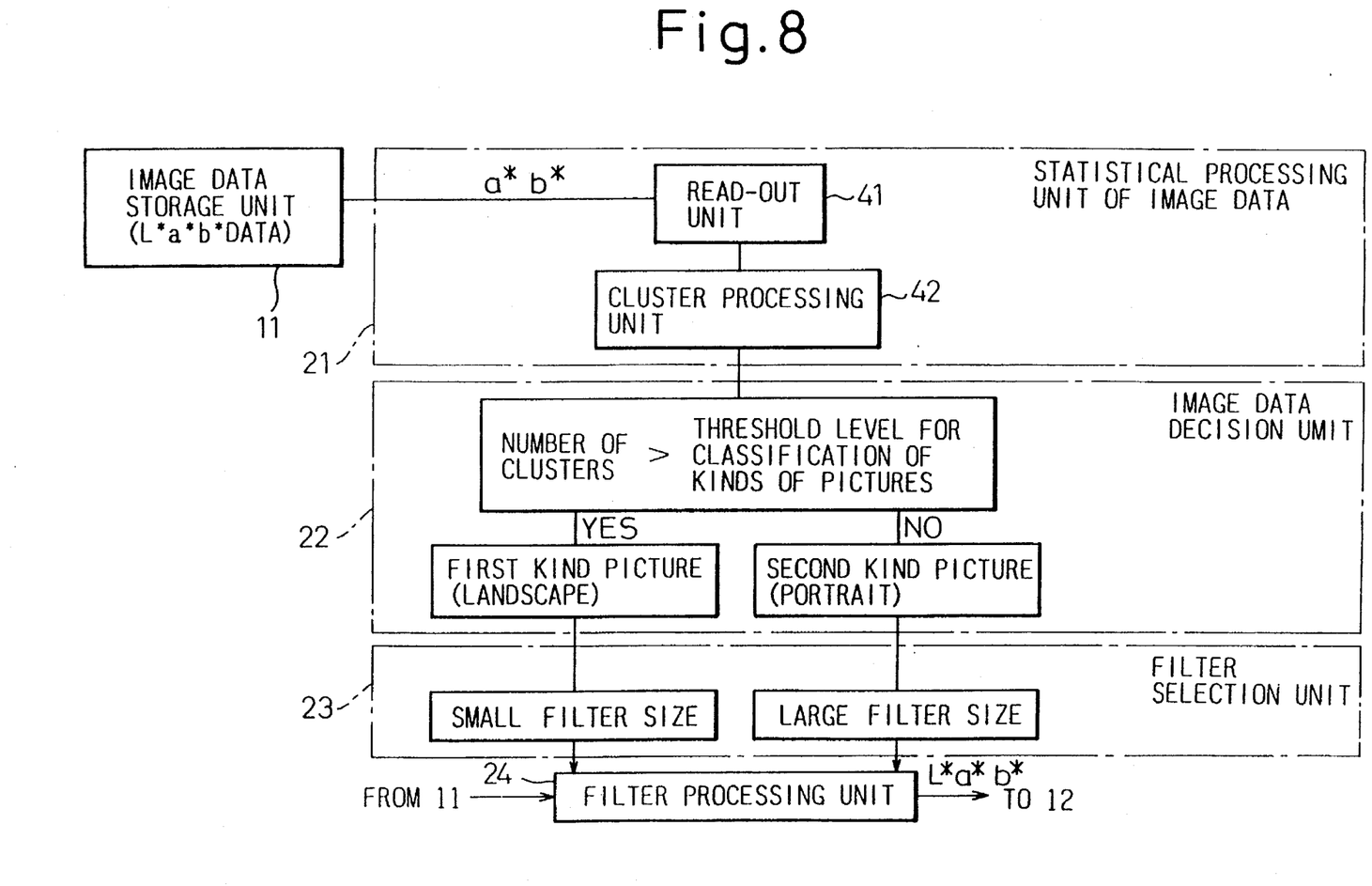
FIG. 8 is a view of a second embodiment of the present invention.

FIG. 8 is a view of a second embodiment of the present invention. In the second embodiment, the image data statistical processing unit 21 extracts the characteristics of picture element distribution by dividing the picture as a whole into clusters of types of picture elements having identical picture element attributes. The image data decision unit 22 is designed to decide if the input image is a first kind of picture or a second kind of picture in accordance with whether the number of picture element clusters which have been obtained by the division is large or small.

Preferably, the data L*a*b* is used in the second embodiment as well.

More specifically, as shown in FIG. 8, the image data statistical processing unit 21 is comprised of a picture data read-out unit 41 for reading out the data a*b* of all the picture elements of a picture and a cluster processing unit 42 for classifying all the data a*b* from the image data read-out unit 41 so as to collect the data a*b* having the identical attributes.

Further, the image data decision unit 22 is designed to compare the number of clusters of the data a*b* having identical attributes, classified by the cluster processing unit 42, with a predetermined threshold for discrimination of the kind of the picture and to decide if a picture is a first kind of picture or a second kind of picture in accordance with whether the number of the groups is large or not. That is, the first kind of picture (landscape) usually has a large number of color changes and a large number of clusters of different types of colors in the picture. As opposed to this, the second kind of picture (portraits) generally has few color changes and even if there are clusters of various types of colors in the picture, the number of the clusters is usually smaller than with the first kind of picture.

Figure 9:
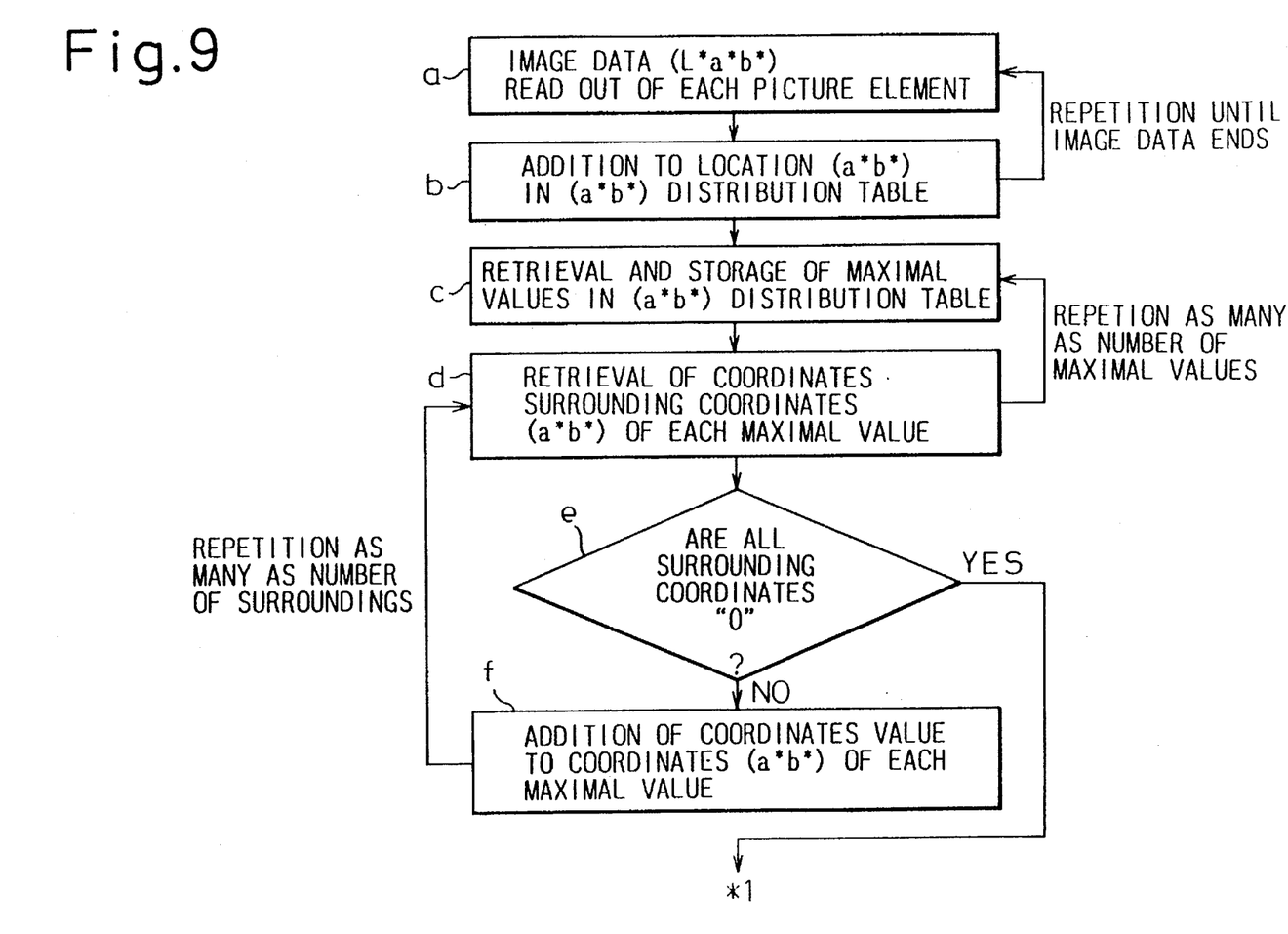
FIG. 9 is a flow chart (part 1) of the operation under the second embodiment.
Figure 10:
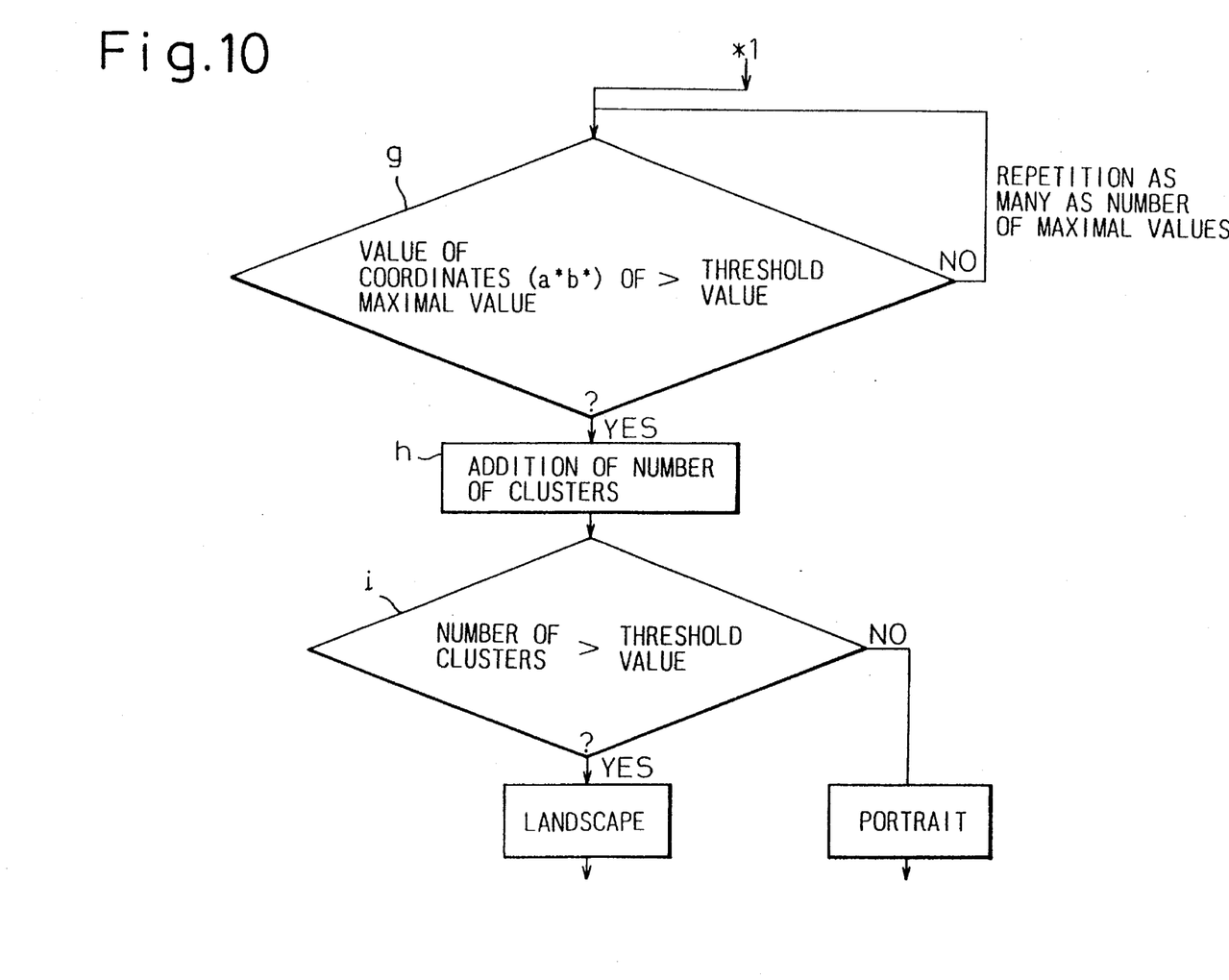
FIG. 10 is a flow chart (part 2) of the operation under the second embodiment.

FIG. 9 and FIG. 10 are flow charts of the operation under the second embodiment (part 1 and part 2). Note that these figures show the steps until just before those of the filter selection unit 23 (FIG. 6). At step b of FIG. 9, the (a*b*) distribution table, for example, forms a matrix with 8 bits of a* (256 combinations) and 8 bits of b* (256 combinations) arranged along the vertical axis and horizontal axis, respectively, for division into 256× 256 squares. A register is provided corresponding to each square. For example, if the picture element of (a*b*)= (10111110, 00110011) is read out, the register corresponding to the square corresponding to this is incremented by 1. If the same color appears after this, the register is further incremented by 1. A register corresponding to a square of a color which does not appear even once remains at 0.

Such a table of frequency of generation of color distribution is provided to find out the color distributions which occur at a high frequency (maximal value of step c).

Up until step c, just the peaks of the color distribution were determined. It is not completely clear whether they are peaks at the centers of clusters of types of colors. Therefore, to improve the reliability much more, steps d, e, and f are introduced. The (a*b*) values of the coordinates around the peaks are retrieved and these are converged to the peaks in question.

In the final analysis, the clusters of the types of colors are selected by step e. The values of (a*b*) of the clusters are diverse, but just the clusters of values exceeding a certain threshold (collections of true colors, and not noise components) are extracted and the number of them added (step h). If the number of the clusters exceeds a certain value, the picture is of the first kind (landscape), while if it does not exceed that certain value, the picture is of the second kind (portrait) (step i).

Finally, a supplementary explanation will be made of the above-mentioned filter when the image data F is given and some type of processing computation is applied thereto, to obtain new image data F', it is possible to express the latter by the following equation (1):

$$F'=G*F \qquad (1)$$

In equation (1), the function G is called a filter.

In the case of digital image data, the computation of the above equation (1) is performed in picture element units. Further, the computation region S is also limited. Therefore, the above equation (1) can be expressed as the following equation (2):

$$f'(i,j)=\Sigma g(k,l) \cdot f(i+k, j+1), \text{ where } K, l \in S \qquad (2)$$

In equation (2), f(i,J) are the picture element signals (a*b*) of the original image data, and i, j are the two-dimensional coordinates on the picture.

f'(i,J) are picture element signals (a*b*) of image data after the filter processing, g(i,j) are the elements of the filter, and S is a computation region. For example, this can be expressed by the following equation (3):

$$f'(i,j)=1/n \cdot \Sigma f(i+k, j+1), \text{ where } k, l \in S \qquad (3)$$

Note that n is the number of the picture elements belonging to S.

An example of a filter designed for smoothing processing is illustrated below:

TABLE 1

| 1/9 | 1/9 | 1/9 |
|-----|-----|-----|
| 1/9 | 1/9 | 1/9 |
| 1/9 | 1/9 | 1/9 |

The above filter is a filter constructed of a 3×3 matrix. The filter element at this time (g(i,j)) is 1/9 and the size of the filter is relatively large. For a filter in the case of sharpening processing, use is made for example of the following filter:

TABLE 2

| 1/25 | 1/25 | 1/25 | 1/25 | 1/25 |
|------|------|------|------|------|
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |

This filter is a filter comprised of a 5×5 matrix. The filter element at this time is 1/25 and the filter size is small.

As explained above, according to the present invention, it is possible to automatically select a filter of a small filter size suited to a landscape or a filter of a large filter size suited to a portrait automatically, even if the operator initially designates sharpening processing and even during that processing. Similarly, it is possible to automatically select a filter of a small filter size suited to a landscape or a filter of a large filter size suited to a portrait automatically, even if the operator initially designates smoothing processing and even during that processing. Accordingly, it is possible to have a higher quality image than in the past output to the printer or shown on a display. Further, it is possible to perform the automatic selection at a high speed by taking note of only the data a*b* (excluding the data L*).

We claim:

1. An image data processing apparatus which applies processing to original image data input from an image data storage unit and then supplies the processed image data to an image output unit, wherein said original image data is comprised of data L* representing saturation and data a*b* representing hue and brightness, expressed under a uniform color space, said image data processing apparatus comprising:

an image data statistical processing unit which receives only the data a*b* of the original image data from the image data storage unit and extracts and performs statistical processing on the picture element distribution in the picture expressed by the original image data, said image data statistical processing unit further comprising:

a line read-out unit for individually reading out the data a* and b* of the picture elements for each line in a picture comprised of a plurality of lines, a level difference calculation unit for calculating the corresponding level differences of the data a* and b* between adjoining picture elements from the output of the line read-out unit, and a level difference cumulative calculation unit for extracting the calculated level differences which exceed a certain threshold and cumulatively adding the extracted, calculated level differences for each picture, thereby to calculate and output a cumulative value;

an image data decision unit which decides, based on the results of the statistical processing by the image data statistical processing unit, whether, the picture belongs to a first kind of picture suited for sharpening processing or a second kind of picture suited for smoothing processing;

a filter selection unit which selects a first type of filter when it is judged, based on the results of the decision by the image data decision unit, that the picture belongs to the first kind and selects a second type of filter, of a filter size larger than the first type, when it is judged that the picture belongs to the second kind; and a filter processing unit which uses the selected one of the first type of filter and the second type of filter, as selected by the filter selection unit, to apply filter processing on the original image data from the image data storage unit and supplies the resultant image data to the image output unit.

2. An image data processing apparatus as set forth in claim 1, wherein when the original image data is data showing a landscape or a portrait, the image data decision unit decides that original image data showing a landscape is said first kind of picture and that original image data showing a portrait is said second kind of picture.

3. An image data processing apparatus which applies processing to original image data input from an image data storage unit and then supplies the processed image data to an image output unit, wherein said original image data input to the said image data processing apparatus is data comprised of data L* representing saturation and data a*b* representing hue and brightness, expressed under a uniform color space, said image data processing apparatus comprising:

an image data statistical processing unit which receives only the image data a*b* data of the original image data from the image data storage unit and extracts and performs statistical processing on the picture element distribution in the picture expressed by the original image data, said image data statistical processing unit extracting the characteristics of the picture element distribution by calculating whether the change of color between adjoining picture elements is large or small, for all of the picture as a whole;

an image data decision unit which decides, based on the results of the statistical processing by the image data statistical processing unit and the determination whether the change of color is large or small, whether the picture belongs to a first kind of picture suited for sharpening processing or a second kind of picture suited for smoothing processing;

a filter selection unit which selects a first type of filter when it is judged, based on the results of the decision by the image data decision unit, that the picture belongs to the first kind and selects a second type of filter, of a filter size larger than the first type, when it is judged that the picture belongs to the second kind; and a filter processing unit which uses the first type of filter or the second type of filter, as selected by the filter selection unit, to apply filter processing on the original image data from the image data storage unit and supplies the resultant image data to the image output unit.

4. An image data processing apparatus as set forth in claim 3, wherein said image data statistical processing unit further comprises:

a line read-out unit for individually reading out the data a* and b* of the picture elements for each line in a picture comprised of a plurality of lines;

a level difference calculation unit for calculating the corresponding level differences of the data a* and b* between adjoining picture elements from the output of the line read-out unit; and a level difference cumulative calculation unit for extracting the calculated level differences which exceed a certain threshold and cumulatively adding the extracted, calculated level differences for each picture, thereby to calculate and output a cumulative value.

5. An image data processing apparatus as set forth in claim 3, wherein the image data decision unit compares the cumulative value, output by the level difference cumulative calculation unit, with a predetermined threshold value for differentiation of the kind of picture and decides if a picture is the first kind of picture or the second kind of picture in accordance with whether the cumulative value is large or not.

6. An image data processing apparatus which applies processing to original image data input from an image data storage unit and then supplies the processed image data to an output unit, wherein said original image data input is data comprised of data L* representing saturation and data a*b* representing hue and brightness, respectively, expressed under a uniform color space, said image data processing apparatus comprising:

an image data statistical processing unit which receives only the data a*b* of the original image data, input thereto from the image data storage unit, and extracts and performs statistical processing on the picture element distribution in the picture expressed by the original image data, said image data statistical processing unit extracting the characteristics of the picture element distribution by dividing the picture, as a whole, into clusters of various picture elements having identical picture element attributes;

an image data decision unit which decides, in accordance with the results of the statistical processing by the image data statistical processing unit, whether the picture belongs to a first kind of pictures suited for sharpening process or a second kind of picture suited for smoothing processing in accordance with whether the number of the divided picture element clusters is large;

a filter selection unit which selects a first type of filter when it is judged, based on the results of the decision by the image data decision unit, that the picture belongs to the first kind and selects a second type of filter, of a filter size larger than the first type, when it is judged that the picture belongs to the second kind; and a filter processing unit which uses the selected one of the first type of filter and the second type of filter, as selected by the filter selection unit, to apply filter processing on the original image data from the image data storage unit and supplies the resultant image data to the image output unit.

7. An image data processing apparatus as set forth in claim 6, wherein said image data statistical processing unit further comprises:

an image read-out unit for reading out data a*b* of all picture elements of said picture; and a cluster processing unit for classifying all collect data a*b* from the image data read-out unit so as to collect data a*b* having identical attributes.

8. An image data processing apparatus as set forth in claim 7, wherein said image data decision unit compares the number of clusters of data a*b* having identical attributes, as classified by the cluster processing unit, with a predetermined threshold for discrimination of the kind of picture and decides whether a picture is the first kind of picture or the second kind of picture in accordance with whether the number of clusters is large or not.

* * * * *

UNITED STATES PATENT AND TRADEMARK OFFICE
CERTIFICATE OF CORRECTION

PATENT NO. : 5,497,249
DATED : March 5, 1996
INVENTOR(S) : KOIZUMI et al.

It is certified that error appears in the above-indentified patent and that said Letters Patent is hereby corrected as shown below:

Col. 1, line 8, after "particularly" insert --,--;
line 60, change "performing" to --perform--.

Col. 2, line 4, change "processing:" to --processing,--;
line 66, delete "15".

Col. 4, line 44, after "visually" insert --,--.

Col. 9, line 7 (claim 5, line 2), change "claim 3" to --claim 4--.

Signed and Sealed this

Thirteenth Day of August, 1996

Attest:

Attesting Officer

BRUCE LEHMAN
Commissioner of Patents and Trademarks